United States Patent Office 3,297,949
Patented Jan. 10, 1967

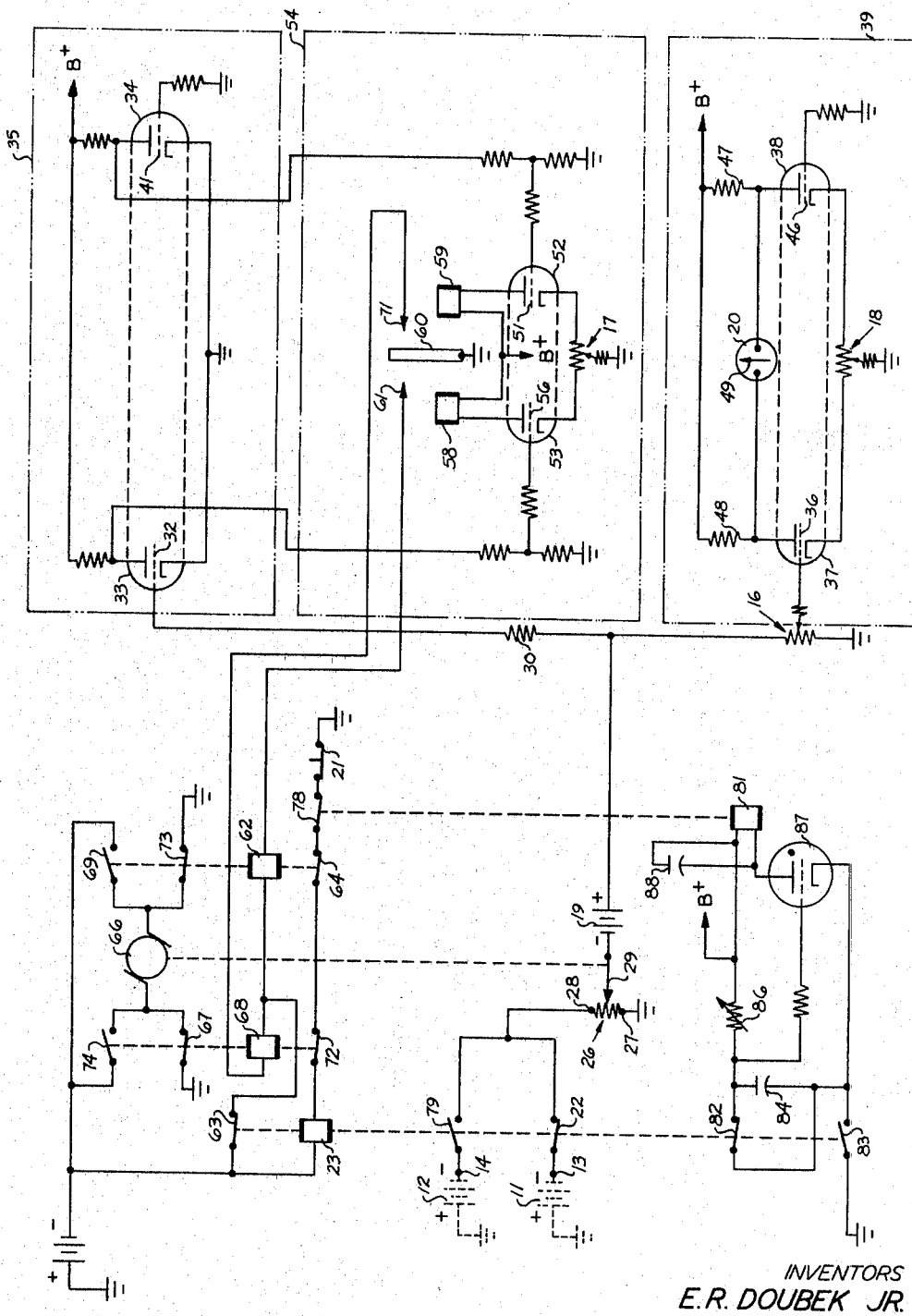
Jan. 10, 1967    E. R. DOUBEK, JR., ETAL    3,297,949
SYSTEMS FOR ASCERTAINING THE RATIO OF ONE
UNKNOWN VOLTAGE TO ANOTHER
Filed March 14, 1963
INVENTORS
E. R. DOUBEK JR.
G. H. KLENKE
BY R. Y. Peters
ATTORNEY

3,297,949
SYSTEMS FOR ASCERTAINING THE RATIO OF ONE UNKNOWN VOLTAGE TO ANOTHER
Edward R. Doubek, Jr., Brookfield, and Gerald H. Klenke, Batavia, Ill., assignors to Western Electric Company, Incorporated, New York, N.Y., a corporation of New York
Filed Mar. 14, 1963, Ser. No. 265,199
5 Claims. (Cl. 324—140)

This invention relates to systems for ascertaining the ratio of one unknown voltage to another, and more particularly, to systems for dividing one unknown voltage by another unknown voltage and indicating the ratio of such voltages on a meter calibrated to read ratios.

In manufacturing operations, it is frequently necessary to monitor or control the ratio of one variable to another variable. For example, in the manufacture of insulated electrical conductors, it is often necessary to monitor or control the percent stretch of a conductor under tension as it is being formed. Since the diameter of the conductor before the application of tension thereto as well as the diameter of the conductor after the application of tension thereto may be transduced into a voltage, a system which directly reads the ratio of one voltage to another finds an important application in the manufacture of electrical conductors.

Accordingly, it is a primary object of the present invention to provide a new and improved system for ascertaining the ratio of one unknown voltage to another.

Another object of the present invention is the provision of a system for dividing one unknown voltage by another unknown voltage and indicating the result on a meter calibrated to read ratios.

With these and other objects in mind, the present invention contemplates a system for ascertaining the ratio of one unknown voltage to another. The system includes a reference voltage and a potential divider which compares one of the unknown voltages to the reference voltage. A null detector responsive to a difference between the unknown voltage and the reference voltage controls the operation of a motor which balances the potential divider. Once the potential divider is so balanced, relay means are operated by the completion of the balancing of the potential divider to disconnect the unknown voltage from the system and connect the other unknown voltage to an indicating device to display thereon the ratio of the unknown voltages.

Other objects and advantages of the present invention will become apparent from the following detailed description and the accompanying drawing which shows a schematic circuit diagram of a system for ascertaining the ratio of one unknown voltage to another.

Referring to the drawing now, there is shown a system for ascertaining the ratio of the magnitude of a first unknown voltage from a source 11 to the magnitude of a second unknown voltage from a source 12. Initially, the unknown voltage sources 11 and 12 are connected, respectively, to terminals 13 and 14 of the system. Also, potential divider 16 is appropriately adjusted with respect to a reference voltage from a source 19 and potential dividers 17 and 18 are adjusted to initially establish a balanced condition of a voltmeter 20 calibrated to read ratios directly.

Simultaneously with the connection of voltage sources 11 and 12 to the system, a normally closed manual switch 21 is held open for a predetermined interval.

Upon the connection of unknown voltage sources 11 and 12 to terminals 13 and 14, the unknown voltage from source 11 is applied through normally closed contacts 22 of an unoperated read relay 23 and through a potential divider 26 to ground. The potential divider 26 includes first and second stationary taps 27 and 28 and a movable center tap 29. The potential divider 26 compares the voltage developed across the first tap 27 and the center tap 29 to the reference voltage of source 19. Such reference voltage of source 19 is connected within the system to oppose the voltage developed across the first tap 27 and the center tap 29. Thus, if the voltage developed across the first tap 27 and the center tap 29 is not equal to or in balance with the reference voltage of source 19, an output voltage having both a magnitude and direction corresponding to the voltage unbalance is produced across the potential divider 16.

More particularly, a first condition may exist wherein the voltage developed across the first tap 27 and the center tap 29 is greater in magnitude than the voltage of the reference source 19. Under this condition a voltage negative with respect to ground is produced across the potential divider 16. The magnitude of this voltage across the potential divider 16 is directly proportional to the difference between the magnitude of the voltage developed across taps 27 and 29 and the magnitude of the reference voltage of source 19.

The negative voltage developed across the potential divider 16 is directed through a protecting resistor 30 to a grid 32 of a triode 33. The triode 33 in conjunction with another triode 34 constitutes a first stage 35 of a null detector. These triodes 33 and 34 conduct equally when there is no voltage across the potential divider 16; but now due to the presence of the aforementioned negative voltage across the potential divider 16, the conduction of the triode 33 decreases while the conduction of the triode 34 remains unchanged.

Similarly, the negative voltage developed across the potential divider 16 is directed to a grid 36 of a triode 37. The triode 37 along with another triode 38 constitutes a D.C. differential amplifier which is included within an indicating circuit 39. Both triodes 37 and 38 conduct equally when there is no voltage across the potential divider 16; however, now due to the presence of the negative voltage across the potential divider 16, the conduction of the triode 38 increases while the conduction of the triode 37 decreases.

Such increased conduction of the triode 38 increases the voltage across a resistor 47 in the plate circuit of such triode 38. On the other hand, the decreased conduction of the triode 37 produces only a small voltage across a resistor 48 in the plate circuit of such triode 37. Thus, a pointer 49 of the voltmeter 20 deflects from the null position in accordance with the magnitude of the voltages across resistors 47 and 48.

A triode 52 in conjunction with another triode 53 constitutes a second stage 54 of the null detector. These triodes 52 and 53 conduct equally when there is no voltage across the potential divider 16. And under this condition, the fields produced by first and second operating coils 58 and 59 of a polar relay, which are connected respectively in the plate circuits of such triodes 52 and 53, are equal and a contactor 60 of such relay therefore remains in its central position. Now however, due to the negative voltage across the potential divider 16, the decreased conduction of the triode 33 results in an increased (or more positive) voltage on a grid 56 of the triode 53, thereby effectuating increased conduction of such triode 53. Also, due to the presence of the negative voltage across the potential divider 16, the conduction of the triode 34 remains unchanged, and the conduction of the triode 52 remains substantially unchanged.

Increased conduction of the triode 53 biases the coil 58 of the polar relay in such a manner as to cause the normally centered grounded contactor 60 to engage its contact 61. This completes a circuit for the operation of a relay 62 over a path including grounded contactor 60, contact 61, relay 62, normally closed contacts 63 of unoperated read relay 23, and negative battery to ground.

Upon the operation of the relay 62, the manual switch 21 is released to permit the closing thereof.

Operation of the relay 62 opens normally closed contacts 64, which prevents the completion of a circuit to energize the read relay 23 even though the switch 21 is now closed.

Operation of the relay 62 energizes a reversible D.C. motor 66. The energizing circuit may be traced from ground, normally closed contacts 67 of unoperated relay 68, motor 66, now closed contacts 69 of now operated relay 62, and negative battery to ground.

Energization of the motor 66 rotates its shaft (not shown in detail but represented by a dashed line in the drawing) to force the movable center tap 29 of the potential divider 26 downwardly until the voltage developed across the first tap 27 and the center tap 29 equals or balances with the reference voltage of source 19.

On the other hand, a second condition may exist wherein the voltage developed across the first tap 27 and the center tap 29 is smaller in magnitude than the reference voltage of source 19. Under this condition the potential divider 26 is still balanced, but in a manner different from that when the voltage across the first tap 27 and the center tap 29 is larger in magnitude than the reference voltage of source 19. More particularly, if the voltage across the first tap 27 and the center tap 29 is smaller than the magnitude of the reference voltage of source 19, a voltage positive with respect to ground is produced across the potential divider 16. This positive voltage is directed to grids 32 and 36. Since grids 32 and 36 are now more positive than grids 41 and 46, which are held at ground potential, conduction of triodes 33 and 37 increases. Also, with this positive voltage across the potential divider 16, conduction of the triode 34 remains unchanged, while conduction of the triode 38 decreases.

Increased conduction of the triode 37 produces an increased voltage across the resistor 48. The decreased conduction of the triode 38 produces only a small voltage across the resistor 47. Thus, the pointer 49 of the voltmeter 20 deflects from the null position in accordance with the magnitude of the voltage across the resistors 48 and 47.

Furthermore, increased conduction of the triode 33 results in a decreased (or more negative) voltage on the grid 56 of the triode 53, while the voltage at the grid 51 of the triode 52 is relatively unchanged. Therefore, the triode 52 conducts more than the triode 53 to bias the coil 59 of the polar relay to attract the normally centered grounded contactor 60 thereto. This places the contactor 60 in engagement with its contact 71 to operate a relay 68 over a path including grounded contactor 60, contact 71, relay 68, normally closed contacts 63 of unoperated read relay 23, and negative battery to ground.

Upon the operation of the relay 68, the manual switch 21 is released to permit the closing thereof.

Operation of the relay 68 opens normally closed contacts 72, which prevents the completion of a circuit to energize the read relay 23 even though the switch 21 is now closed.

Operation of the relay 68 energizes the reversible D.C. motor 66. The energizing path for the motor 66 may be traced from ground, normally closed contacts 73 of unoperated relay 62, motor 66, now closed contacts 74 of now operated relay 68, and negative battery to ground.

Energization of the motor 66 rotates its shaft, not shown, to force the movable center tap 29 upwardly until the voltage developed across the first tap 27 and the center tap 29 equals or balances with the reference voltage of source 19.

Upon the balancing of the potential divider 26, the voltage across the potential divider 16 becomes equal to zero and grids 32 and 36 return to ground potential. Thus, grids 41 and 46 are at the same potential as grids 32 and 36, thereby balancing the conduction of the triodes 33, 34, 37, 38, 52 and 53, all of which are linear. Therefore, the previously biased grounded contactor 60 returns to its center position to release any previously operated relay 62 or 68. Release of any relay 62 or 68 opens the corresponding contacts 69 or 74 to de-energize the motor 66. De-energization of the motor 66 stops further movement of the center tap 29 and leaves the potential divider 26 in its balanced condition. Furthermore, the closure of the contacts 67 and 73 provides dynamic braking of the motor 66 to quickly stop any motion of the rotor thereof. In addition, the closure of such contacts 76 and 73 short circuits the motor 66 to prevent further energization thereof as long as these contacts 67 and 73 remain closed.

Also, upon the balancing of the potential divider 26, the voltage across each resistor 47 and 48 becomes equal and the pointer 49 of the meter 20 goes back to its null position.

A third condition may exist wherein the voltage from source 11 developed across the first tap 27 and the center tap 29 is equal in magnitude to the reference voltage of source 19. Under this condition the triodes 33 and 34 are balanced and have no operating effect on the triodes 52 and 53. Also, neither the polar relay coil 58 nor 59 is biased and the contactor 60 remains in its normal center position. Additionally, the pointer 49 of the meter 20 maintains or immediately assumes its null position, and neither of the relay 62 nor 68 is energized and the motor 66 is not operated.

Under this third condition, the manual switch 21 may be closed after the interval necessary to determine that no operation of the motor 66 will occur.

After the balancing occurs with the unknown voltage of source 11 connected to the system under the two previously described conditions, or no balancing is necessary under the third condition, the contactor 60 assumes its center position and the relays 62 and 68 are released and contacts 64 and 72 are closed. At this time the read relay 23 is energized over a path including ground, now closed manual switch 21, normally closed contacts 78 of unoperated calibrate relay 81, normally closed contacts 64 of unoperated relay 62, normally closed contacts 72 of unoperated relay 68, relay 23, and negative battery to ground.

Operation of the read relay 23 opens contacts 63 to open the operating path of relays 62 and 68, thereby preventing any movement of the center tap 29 after the potential divider 26 has reached a balanced condition.

Moreover, operation of the read relay 23 opens contacts 22 to disconnect the first unknown voltage of source 11 from the system and further closes contacts 79 to connect the second unkown voltage of source 12 to the system. More specifically, operation of the read relay 23 applies the unknown voltage from source 12 through terminal 14, through now closed contacts 79 of now operated read relay 23, and through the potential divider 26 to ground. Inasmuch as the center tap 29 of the potential divider 26 has already been adjusted to balance the voltage from source 11 developed across taps 27 and 29 to the reference voltage from source 19, the application of the unknown voltage from source 12 to the potential divider 26 produces a voltage which appears across the potential divider 16. This voltage across the potential divider 16 is the difference between the voltage developed across taps 27 and 29 and the reference voltage of source 19. Accordingly, if voltages from sources 11 and 12 are not equal, the conduction of the triodes 37 and 38 is changed to produce a changed voltage across the resistors 47 and 48. Such voltage deflects the pointer 49 of the meter 20 to indicate on such meter 20, in the form of a ratio, the effect of the unknown voltage from the source 12 on the system. If the voltages of sources 11 and 12 are equal, conduction of the triodes 37 and 38 remain balanced and no voltage is produced across the meter 20. Therefore, the pointer 49 of the meter 20 remains in the null position, indicating a ratio of one. Thus, the ratio of the voltage of source 11 to the voltage of source 12 has been indicated on the meter 20 which is calibrated to read ratios directly.

In addition to the changed conduction of the triode 37 due to a voltage across potential divider 16, the conduction of triode 33 changes, producing an unbalance of the triodes 52 and 53. However, this unbalance of the triodes 52 and 53 cannot initiate the operation of the motor 66 because the operating path for the control relays 59 and 68 thereof has been opened by the operation of read relay 23 and the opening of contacts 63.

Operation of the read relay 23 also initiates rebalancing of the system. When the relay 23 is operated, it opens normally closed contacts 82 and closes normally open contacts 83. Opening of contacts 82 and closing of contacts 83 permits a capacitor 84 to charge after a predetermined time through a resistor 86. Also, closing of contacts 83 completes the plate circuit of a thyratron 87, resulting in the firing of the thyratron 87 after the voltage across the capacitor 84 reaches the critical value for such thyratron 87. Firing of the thyratron 87 charges a capacitor 88, which is in parallel with the calibrate relay 81, as well as ultimately operates the relay 81.

Operation of the relay 81 releases the read relay 23 by opening normally closed contacts 78 to break the operating path for such relay 23. Release of the relay 23 reconditions the relays 62 and 68 for operation by the closure of contacts 63. Release of the relay 23 also disconnects the source 12 and reconnects the source 11 to the potential divider 26 by the opening of contacts 79 and closing of contacts 22. Further, release of the relay 23 shuts off the thyratron 87 by breaking the plate circuit thereof by opening of normally open contacts 83. Additionally, release of the relay 23 short-circuits the charge across the capacitor 84 by closing contacts 82.

The relay 81 does not release immediately upon the shutting-off of the thyratron 87, however, as the capacitor 88 discharges through the relay 81 to maintain it operated for a further interval. During this interval any difference in magnitude between the voltage of the source 11 (rather than the source 12 because the read relay 23 is now released) and the reference voltage 19 is reflected in the potential divider 16, producing bias in one or the other of the coils 58 and 59 of the polar relay if unbalance exists, in a manner as described previously.

In the event that bias is produced in one of the coils 58 or 59, resultant movement of the contactor 60 operates one of the associated relays 62 or 68 thereby energizing the motor 66 to rebalance the system by movement of the tap 29, all as described previously. The operation of either relay 62 or 68 results in the opening of their associated contacts 64 or 72, which prevents the read relay 23 from operating after the capacitor 88 discharges to release relay 81 until rebalancing is completed.

After rebalancing is completed, either of the operated relays 62 or 68 releases, since the contactor 60 assumes its center position. At this time the contacts 64 or 72 reclose and the read relay 23 again operates.

If it were not for the capacitor 88, the read relay 23 would be operated immediately upon shut-off of the thyratron 87 and release of the relay 81, and the system might not be rebalanced prior to the subsequent sampling of the unknown voltage from the source 12.

Thereafter the circuit continues its operation as described above to periodically measure the ratio of the unknown voltages at intervals determined by the values of the capacitor 84 and the resistor 86.

Initially, it was indicated that at the start of operation the manual switch 21 was opened for an interval of time. If this were not done, the read relay 23 would operate immediately and the magnitude of the source 12 would be reflected to the meter 20 before any balancing could occur with respect to the source 11, which might result in an erroneous reading. No balancing could take place at this time, as operation of the relay 23 would open the contacts 63 and would preclude operation of the relays 62 and 68 and thus energization of the motor 66. However, after the first cycle of operation, the capacitor 88, relay 81 and contacts 78 prevent reoperation of the relay 23 until rebalancing occurs, if necessary, as described above.

In the event that manual switch operation is not desirable at start-up, a slow-to-operate relay may be included having a normally open contact pair in series with the contacts 64 and 72 and the relay 23. The slow-to-operate relay would be timed so that it would operate to close its contacts after the relay 62 or 68 had a chance to operate if balancing were necessary.

With this circuitry the manual switch 21 may still be provided to permit the operator to effectuate manual rebalancing, particularly if he has made a change to the product. This may be particularly desirable if there are long intervals between operations of the calibrate relay 81.

Possible applications of the system for ascertaining the ratio of one unknown voltage to another include monitoring and controlling devices having two or more variables. For example, such systems may be used for, among other things, measuring the percent stretch of electrical conductors under tension.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a system for ascertaining tthe ratio of a first unknown voltage to a second unknown voltage,
    a potential divider including first and second stationary taps and a movable center tap,
    means for connecting the first unknown voltage across the first and second taps,
    a reference voltage connected across the first and the center taps to oppose the first unknown voltage,
    means for detecting the difference between the voltage across the first and center taps and the reference voltage,
    servo means responsive to said detected difference for moving the center tap of the potential divider until the voltage across the first and center taps substantially equals the magnitude of the reference voltage,
    means operated by the completion of the movement of the moving means for disconnecting the first voltage from the potential divider and connecting the second voltage across the first and second taps of the potential divider, and
    indicating means connected to the output of said detecting means for indicating the ratio of the unknown voltages when said second voltage is connected to said potential divider.

2. In a system for ascertaining the ratio of a first unknown source of direct current to a second unknown source of direct current,
    a potential divider including first and second stationary taps and a movable center tap,
    a first set of normally closed contacts for connecting the first source across the first and second taps,
    a second set of normally open contacts for connecting the second source across the first and second taps,
    a reference source of direct current connected across the first and center taps to oppose the voltages of the unknown sources,
    a first stage null detector for sensing the presence of a voltage across the first and center taps of the potential divider,
    a second stage null detector responsive to said first stage and including polar relay means controlled by said second stage, a direct current motor operated by the polar relay means and having the shaft thereof coupled to the center tap of the potential divider for balancing said potential divider by moving said center tap until the voltage across the first and center taps equals the magnitude of the reference source, an indicating circuit including a displaying device for detecting the voltage across the first and center taps, first relay means operated by the completion of the movement of the shaft of the motor for opening said first set of normally closed contacts and for closing said second set of normally open contacts to disconnect the first source from the potential divider and connect the second source across the first and second taps of the potential divider to display the ratio of the unknown voltages on the displaying device, second relay means for releasing the first relay means, a capacitor connected in parallel with said second relay means, and a thyratron having the parallel combination of the second relay means and capacitor connected in the plate circuit thereof and operated by said first relay means for operating said second relay means to release after a predetermined time said first relay means to reclose said first set of normally closed contacts and reopen said second set of normally open contacts to rebalance said potential divider and to again operate after a predetermined time said first relay means to reopen said first set of normally closed contacts and to reclose said second set of normally open contacts to again display the ratio of the unknown voltages on the displaying device.

3. In a system for ascertaining the ratio of a first unknown voltage to a second unknown voltage:

a reference voltage;

a potentiometer having first and second stationary taps and a movable center tap;

means for sequentially connecting the unknown voltages across the first and second taps;

control means operating only when the first unknown voltage is connected to the potentiometer and responsive to a difference between the voltage on the center tap and the reference voltage for adjusting the center tap until the voltage on the center tap substantially equals the reference voltage; and means for comparing the voltage on the adjusted center tap to the reference voltage while only the second unknown voltage is connected to the potentiometer to indicate the ratio of the unknown voltages.

4. In a system as defined in claim 3:

means operated by the connecting means a predetermined time after the second unknown voltage is connected to the potentiometer for disconnecting the second unknown voltage from the potentiometer and reconnecting the first unknown voltage to the first and second taps.

5. In a system for ascertaining the ratio of a first unknown voltage to a second unknown voltage:

a potential divider including first and second taps and a movable center tap;

means for connecting the first unknown voltage across the first and second taps;

a reference voltage connected across the first and center taps in opposition to the first unknown voltage;

a resistance connected in series with the reference voltage and the first and center taps;

servo means connected across the resistance and operated only when the first unknown voltage is connected to the potential divider for adjusting the center tap of the potential divider until the voltage across the resistance substantially equals zero;

means operated when the voltage across the resistance substantially equals zero for disconnecting the first voltage from the potential divider and for connecting the second voltage across the first and second taps of the potential divider while said center tap remains in its adjusted position to produce an output voltage across the resistance which is proportional to the ratio of the unknown voltages; and utilization means responsive to said output voltage.

References Cited by the Examiner
UNITED STATES PATENTS

| | | | |
|---|---|---|---|
| 2,454,520 | 11/1948 | Moore | 235—196 X |
| 2,678,422 | 5/1954 | Broomell | 324—140 X |
| 2,881,392 | 4/1959 | Heinz | 324—140 X |
| 2,896,165 | 7/1959 | Hornig | 324—140 |
| 3,076,955 | 2/1963 | Huddleston | 235—196 X |

WALTER L. CARLSON, *Primary Examiner.*

RUDOLPH V. ROLINEC, *Examiner.*